(12) United States Patent
Yang et al.

(10) Patent No.: US 7,985,505 B2
(45) Date of Patent: Jul. 26, 2011

(54) FUEL CELL APPARATUS AND ASSOCIATED METHOD

(75) Inventors: Hai Yang, Shanghai (CN); Jun Cai, Shanghai (CN); Rihua Xiong, Shanghai (CN); Chang Wei, Niskayuna, NY (US); Qunjian Huang, Shanghai (CN); Andrew Philip Shapiro, Schenectady, NY (US); Jinghua Liu, Shanghai (CN); Shengxian Wang, Shanghai (CN); Xianguo Yu, Shanghai (CN)

(73) Assignee: General Electric Company, Niskayuna, NY (US)

( * ) Notice: Subject to any disclaimer, the term of this patent is extended or adjusted under 35 U.S.C. 154(b) by 1257 days.

(21) Appl. No.: 11/640,014

(22) Filed: Dec. 15, 2006

(65) Prior Publication Data

US 2008/0145719 A1 Jun. 19, 2008

(51) Int. Cl.
*H01M 12/08* (2006.01)
*H01M 8/08* (2006.01)
*H01M 8/18* (2006.01)

(52) U.S. Cl. ........ 429/405; 429/407; 429/418; 429/457; 429/498; 429/501; 429/514

(58) Field of Classification Search .................. None
See application file for complete search history.

(56) References Cited

U.S. PATENT DOCUMENTS

| | | | |
|---|---|---|---|
| 3,239,384 A | 3/1966 | Meyers | |
| 3,468,713 A | 9/1969 | Mueller | |
| 3,666,561 A | 5/1972 | Chiku | |
| 4,015,052 A | 3/1977 | Cherón | |
| 4,037,023 A | 7/1977 | Grehier et al. | |
| 4,168,349 A | 9/1979 | Buzzelli | |
| 4,176,213 A | 11/1979 | van Linden | |
| 4,243,731 A | 1/1981 | Cherón | |
| 4,276,355 A | 6/1981 | Kothmann et al. | |
| 4,292,379 A | 9/1981 | Kothmann | |
| 4,308,322 A | 12/1981 | Hammar | |
| 4,324,844 A | 4/1982 | Kothmann | |
| 4,342,816 A | 8/1982 | Kothmann et al. | |
| 4,366,211 A | 12/1982 | Pollack | |
| 4,383,009 A | 5/1983 | Kothmann | |
| 4,414,291 A | 11/1983 | Breault | |
| 4,463,066 A | 7/1984 | Adlhart et al. | |
| 4,463,067 A | 7/1984 | Feigenbaum | |
| 4,463,068 A | 7/1984 | Cohn et al. | |
| 4,467,019 A | 8/1984 | Feigenbaum | |
| 4,481,266 A | 11/1984 | Littauer et al. | |
| 4,572,876 A | 2/1986 | Spurrier | |
| 4,732,822 A | 3/1988 | Wright et al. | |
| 4,735,872 A | 4/1988 | Maimoni | |
| 4,820,598 A | 4/1989 | Descroix et al. | |
| 4,842,963 A | 6/1989 | Ross, Jr. | |
| 4,963,444 A | 10/1990 | Delaney | |
| 5,340,067 A | 8/1994 | Martin et al. | |
| 7,374,837 B2 * | 5/2008 | Osenar et al. | 429/460 |
| 2003/0129459 A1 * | 7/2003 | Ovshinsky et al. | 429/9 |
| 2004/0131906 A1 * | 7/2004 | Ovshinsky et al. | 429/27 |

* cited by examiner

Primary Examiner — Jonathan Crepeau
(74) Attorney, Agent, or Firm — Joseph J. Christian

(57) ABSTRACT

An apparatus is provided that relates to an electrochemical cell assembly. The apparatus is capable of controlling water loss from a fuel cell, at least in part by separating gas and liquid fluid flows. A variety of flow designs are provided that separate liquid electrolyte flow from reagent gas flow. Some flow designs may be suitable for one or more of fuel cells, rechargeable fuel cells, and batteries such as metal hydride batteries. Furthermore, some embodiments may include a single electrochemical cell, or plurality of cells arranged in parallel or in series. Some embodiments may also relate to methods of mitigating water loss from an electrochemical cell assembly.

17 Claims, 10 Drawing Sheets

FUEL CELL APPARATUS AND ASSOCIATED METHOD

BACKGROUND

1. Technical Field

Some embodiments of the invention may relate to rechargeable fuel cells. Some embodiments may include channels for fluid such as air or liquid electrolytes to flow through.

2. Discussion of Related Art

Water management is a substantial issue in rechargeable fuel cells, especially air metal hydride fuel cells. In general, this is due to the open or semi-opened architecture of such cells. Thus, water can be lost through evaporation through the openings at the air electrode, for example. Evaporative losses may be especially pronounced during charging when oxygen gas is produced. Water loss causes the internal resistance to increase and adversely affect the performance of the fuel cell. Under relatively humid conditions, condensation of ambient moisture can cause flooding of the air electrode due to water uptake by the cell. This effect would adversely affect the performance of the cell by blocking oxygen access to the air electrode. Additionally, in conventional planar designs or in high capacity cells, there is not enough room to store extra water that may be produced or absorbed by the cell. Thus, the prior art is subject to flooding or to prematurely drying.

It may be desirable to have a fuel cell flow design that differs from those designs that are currently available. It may be desirable to have a method of using a fuel cell that differs from those methods currently available.

BRIEF DESCRIPTION

An embodiment of the invention includes an apparatus. The apparatus includes a fuel cell including an electrode having a surface. A spacer is secured to the electrode surface. The spacer has a surface that defines a channel that extends from a first port across the spacer surface to a second port. The first port receives a fluid and provides the fluid to the channel. The channel allows the fluid to flow therethrough to the second port. The second port receives the fluid from the channel. The channel has a portion that opens toward the electrode surface such that the fluid is in contact with the electrode surface as the fluid flows from the first port through the channel to the second port.

A method is provided that includes flowing at least one reagent to a fuel cell through a first inlet port and splitting the reagent flow into a plurality of parallel circuit flow paths. Each of the plurality of parallel circuit flow paths extends from the first inlet port, contacts a first electrode capable of electrochemically reacting with the reagent, and flows further to a first outlet port.

Another embodiment of the invention includes a device. The device includes a fuel cell having a plurality of electrodes spaced apart and electrically insulated from each other. However, the electrodes are in electrical communication through at least one electrochemical reaction. The device also includes an electrical insulator that is electrically isolating one of the plurality of electrodes from another of the plurality of electrodes. The embodiment also includes one or both of a means for defining at least one electrolyte flow path, and a means for defining at least one gaseous flow path. The means for defining at least one liquid electrolyte flow path, includes liquid electrolyte disposed therein, which is in electrochemical communication with at least one electrode. Furthermore, the electrolyte flow path or paths is in fluid communication with at least one electrolyte input port and at least one electrolyte output port. The means for defining at least one gaseous flow path includes a gas disposed therein. The gas is in electrochemical communication with at least one electrode. Furthermore, the gaseous flow path is in fluid communication with at least one gas input port and at least one gas output port. The gaseous flow path is separate from, and not in fluid communication with, the electrolyte flow path.

BRIEF DESCRIPTION OF THE DRAWING FIGURES

DETAILED DESCRIPTION

Figure 1:
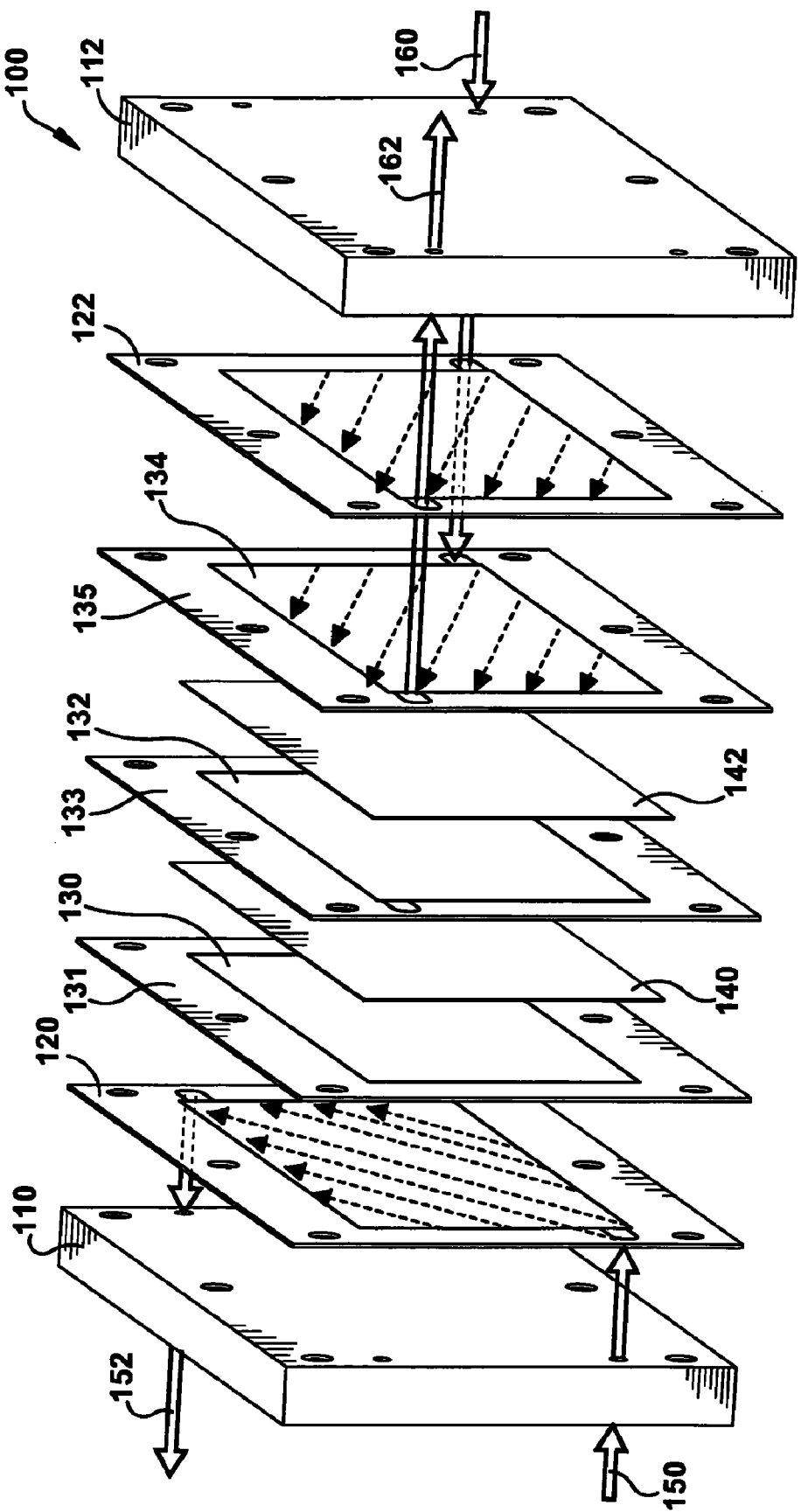
FIG. 1 is an exploded view drawing of an embodiment having a planar flow design where the oxygen and electrolytes enter and exit the system through the same end plate.

The invention may include embodiments that relate to a fuel cell or secondary battery. Some embodiments of the invention may relate to a method associated with the fuel cell or secondary battery.

Approximating language, as used herein throughout the specification and claims, may be applied to modify any quantitative representation that could permissibly vary without resulting in a change in the basic function to which it is related. Accordingly, a value modified by a term such as "about" may not to be limited to the precise value specified, and may include values that differ from the specified value. In at least some instances, the approximating language may correspond to the precision of an instrument for measuring the value. Similarly, "free" may be used in combination with a term, and may include an insubstantial number, or trace amounts, while still being considered free of the modified term.

As used herein, the term membrane may refer to a selective barrier that permits passage of protons and/or hydroxide ions generated at a cathode through the membrane to the anode for oxidation of hydrogen atoms at the anode to form water and heat. The terms cathode and cathodic electrode refer to a metal electrode that may include a catalyst. At the cathode, or cathodic electrode, oxygen from air is reduced by free electrons from the usable electric current, generated at the anode, that combine with water, generated by the anode, to form hydroxide ions and heat.

Some embodiments may include a flow design capable of allowing $CO_2$ free air or pure oxygen to flow through channels in, or in contact with, one or more air electrodes. Some embodiments may also include channels for liquid electrolytes. The flow design associated with the invention enables improved water management and oxygen supply. Furthermore, the flow design enables oxygen that is released during a charging process to be carried away from the metal hydride electrode.

Some embodiments may include three electrodes wherein two electrodes are air electrodes and a third is a liquid electrode. Some three-electrode embodiments may include a metal hydride anode and air electrode for the reduction of oxygen and a third charging electrode that generates oxygen. Flow channels that permit $CO_2$ free air, or oxygen, to flow in proximity to the air electrode may comprise some embodiments. Some embodiments may also include flow channels that permit the flow of liquid electrolyte in proximity to a third charging electrode. According to some embodiments, circulating electrolyte can carry generated oxygen away from the third electrode during charging. Some embodiments may also include an electrolyte tank in series with an electrolyte circulation loop. According to some embodiments, a pump may be used to circulate the electrolyte, and a blower may be used to circulate air. Some embodiments may also include a $CO_2$ scrubbing system for removing $CO_2$ from air. Some embodiments may include a single fuel cell or a plurality of fuel cells. One specific embodiment includes a four-fuel cell stack.

An apparatus 100 comprising an embodiment of the invention is shown in FIG. 1. The apparatus includes a first plate 110. The first plate has at least one gas outlet 152 and at least one gas inlet 150. The gas inlet 150 and outlet 152 are apertures extending through the plate 110. This embodiment may also include a second plate 112. The second plate is oriented opposing the first 110, and has an electrolyte inlet 160 and an electrolyte outlet 162. The electrolyte inlet 160 and outlet 162 are apertures extending through the plate 112. Sandwiched between plates 110 and 112, may be a cathode 130, an anode 132, and a third electrode 134 separated by separating membranes 140 and 142 and sealed with one or more rubber gaskets.

More specifically, the first plate 110 may contact a gas spacer 120 and may be in fluid communication with the gas inlet 150 and gas outlet 152. A cathode 130 may be in contact with the gas spacer. In the illustrated embodiment, the gas spacer is a first gasket and is formed from a synthetic elastomeric composition, such as rubber. The effect of placing the gas spacer 120 between the first plate 110 and the cathode 130 is to create an air space between the first plate 110 and the cathode 130. The air space is in fluid communication with the gas inlet 150 and the gas outlet 152 so that when gas flow is applied to the gas inlet 150, the gas enters the space between the first plate 110 and the cathode 130 and flows out through the gas outlet 152.

The cathode 130 is also in contact with separator membrane 140. The separator contacts the opposite surface of the cathode 130 relative to the gas spacer 120. The separator 140 forms a barrier between the cathode 130 and the anode 132. The anode 132 contacts the opposite surface of the separator 140. A second separator membrane 142 is placed on the opposite surface of the anode 132. A third electrode 134 contacts the opposite surface of the second separator membrane 142. The cathode 130, anode 132 and third electrode 134 each have a peripheral edge. Disposed along the peripheral edge of each electrode is a gasket indicated by reference numbers 131, 133 and 135.

An electrolyte spacer 122 contacts the opposite surface of third electrode 134, which contacts the second plate 112. The electrolyte spacer 122 separates the third electrode 134 from the second plate 112 to define a volume or a gap through which a fluid may flow. The gap is in fluid communication with the electrolyte inlet 160 and electrolyte outlet 162. An electrolyte fluid flow path extends into the electrolyte inlet 160, through the gap, across a surface of the third electrode 134, and out through the electrolyte outlet 162.

Figure 2:
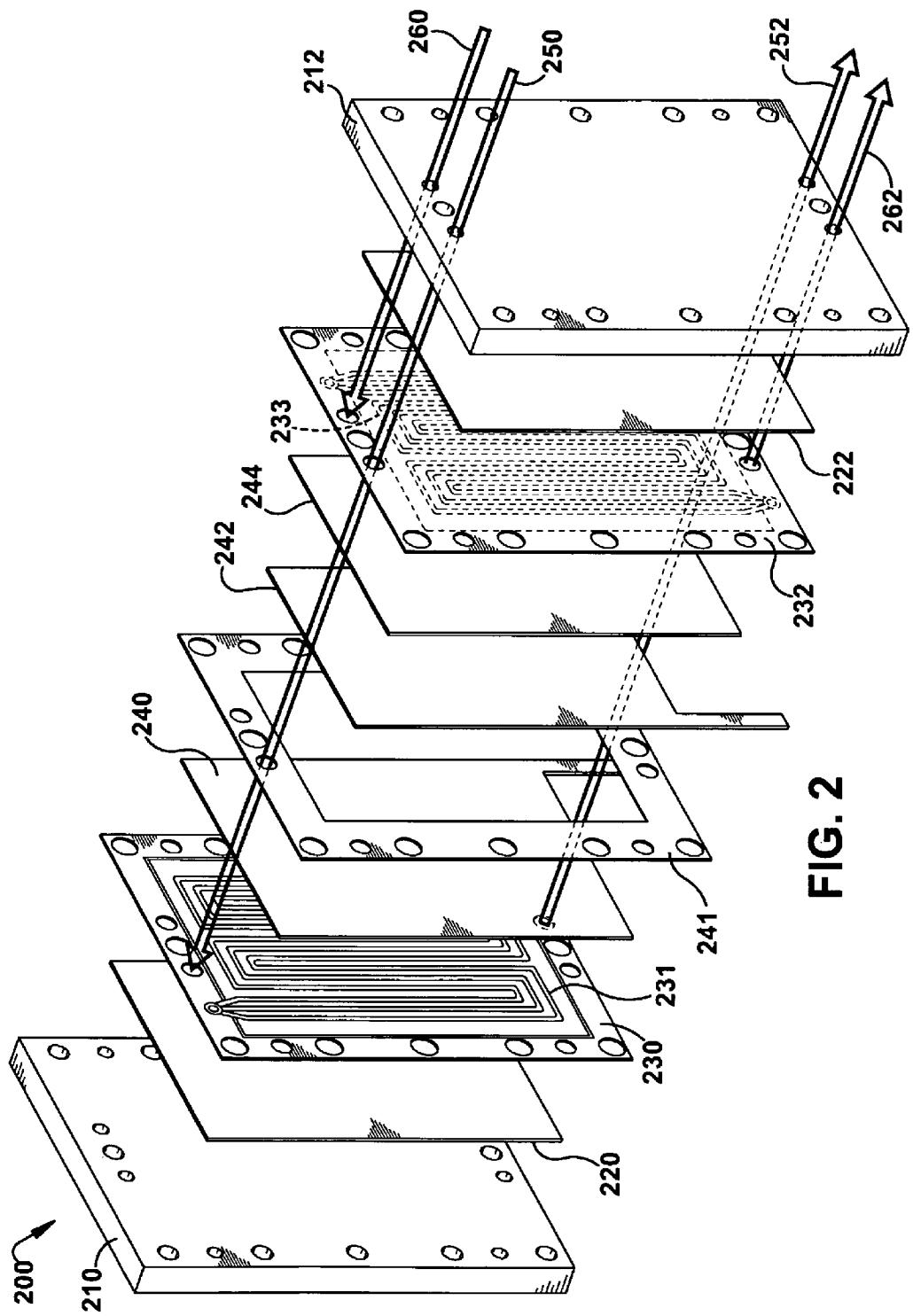
FIG. 2 is an exploded view drawing of an embodiment having fluid channels for electrolyte and oxygen flow.

An apparatus 200 comprising another embodiment of the invention is shown in FIG. 2. The apparatus includes a first plate 210. The first plate has a first surface and a second surface (not indicated by reference numbers). The second surface contacts with a first compression plate 220. The compression plate, formed from rubber, has a first surface and a second face. The second surface of the first plate 210 is in compressive contact with the first surface of the compression plate. The second surface of the compression plate is in compressive contact with an electrolyte plate 230. The electrolyte plate has a first surface and second face. The electrolyte plate first surface contacts the compression plate second surface.

The electrolyte plate defines grooves or channels, indicated by reference number 231. The channels are configured so that fluid into the channel from an electrolyte inlet (not indicated), can flow through the channels, and can flow out through an electrolyte output port 252. The electrolyte plate second surface contacts a first surface (not indicated) of a third electrode 240. A second surface of the third electrode contacts a rubber gasket 241. The third electrode 240 also has an electrolyte input port and electrolyte output port. The electrolyte input port is in fluid communication with the electrolyte input port of the electrolyte plate 230. The electrolyte output port of the third electrode 240 is in fluid communication with the electrolyte output port of the electrolyte plate 230. The gasket 241 contacts an anode 242 at the gasket's 241 second surface and the anode's 242 first face.

The second surface of the anode 242 is adjacent to the first surface of the cathode 244. Each of the anode 242 and the cathode 244 are a plate having a first surface and a second surface. The second surface of the cathode 244 plate contacts a first surface of an oxygen plate 232. The oxygen plate includes fluid channels 233 defined therein, and including an oxygen input and oxygen output, an electrolyte input and an electrolyte output. The electrolyte input and electrolyte output ports of the oxygen plate 232 are not in fluid communication with the channels 233 therein. However, the oxygen input and output ports are in fluid communication with the channels 233 cut in the oxygen plate 232. The electrolyte passes through the oxygen plate 232 and is carried to the third electrode 240. Electrolyte does not contact the anode 242 or the cathode 244. The second surface of the oxygen plate 232 contacts a first surface of a second rubber compression plate 222. The second surface of the rubber compression plate 222 contacts a first surface of a second end plate 212.

The second end plate has an oxygen input port 260 and oxygen output port 262 that are in fluid communication with the oxygen input and output ports of the oxygen plate. The second end plate also has an electrolyte input 250 and an electrolyte output port 252 that are in fluid communication with the electrolyte input and output ports of the electrolyte plate 230. According to the foregoing description, electrolyte enters the electrolyte input port on a second end plate, flows through the system to the electrolyte input port of the electrolyte plate, flows through the channels 231 defined by the electrolyte plate, and flows out through the electrolyte output port of the electrolyte plate. The electrolyte then exits the system through the electrolyte output port 252 of the second end plate.

Figure 3:
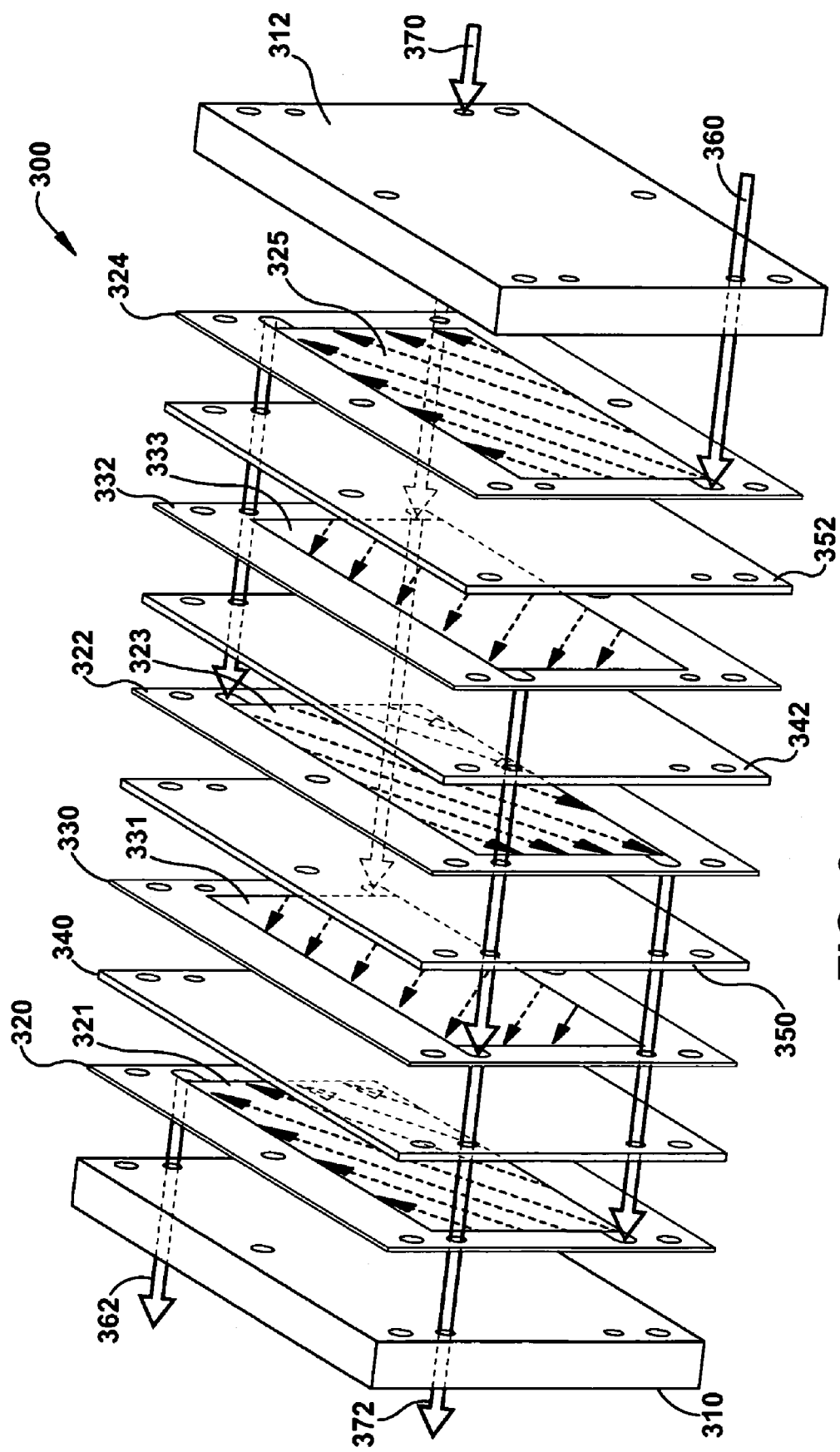
FIG. 3 is an exploded view drawing of an embodiment having a planar flow design where the fluids enter one end plate and exit through the opposing end plate.

An apparatus 300 comprising another embodiment of the invention is shown in FIG. 3. The apparatus includes a rechargeable fuel cell assembly. The fuel cell assembly includes a first end plate 310 and a second end plate 312. Both endplates have a first surface and a second surface. The second surface of the first end plate 310 is in sealing contact with the first surface of a first gas spacer 320.

The second surface of the first gas spacer 320 is in sealing contact with the first surface of a first electrode 340, thereby defining a first gas space. The second surface of the first electrode 340 is in sealing contact with the first surface of a first electrolyte spacer 330. The second surface of the first electrolyte spacer 330 is in sealing contact with the first surface of a second electrode 350, thereby defining a first electrolyte space.

The second surface of the second electrode 350 is in sealing contact with the first surface of a second gas spacer 322. The second surface of the second gas spacer 322 is in sealing contact with the first surface of a third electrode 342 to define a second volume or gas space. The second surface of the third electrode 342 is in sealing contact with the first surface of a second electrolyte spacer 332. The second surface of the second electrolyte spacer 332 is in sealing contact with the first surface of a third gas spacer 324 to define a second electrolyte space.

The second surface of the third gas spacer 324 is in sealing contact with the first surface of the second end plate 312 to define a third gas space. The first gas space 321, second gas space 323, and third gas space 325 are in fluid communication with each other and with the gas inlet port 360 and gas outlet port 362, but not with the electrolyte spaces. Similarly, the first electrolyte space 331 and second electrolyte space 333 are in fluid communication with each other and with the electrolyte input port 370 and electrolyte output port 372, but not with the gas spaces.

During operation of the apparatus, oxygen enters at an inlet port 360, which is in fluid communication with the third gas space 325. Oxygen-containing gas enters the third gas space 325 at one end of the gas space, and passes over the exposed surface of the fourth electrode 352. The oxygen then exits the third gas space 325 at an opposing end of the gas space 325. The oxygen then passes through ports in the fourth electrode 352 and the second electrolyte spacer 332, and enters a second gas space 323. The oxygen enters the second gas space 323 at one end of the gas space 323, and travels over the exposed surfaces of the second 350 and third 342 electrodes. The oxygen then exits the second gas space 323 through a port at an opposing end of the gas space 323. The oxygen then passes through the second electrode 350 and the first electrolyte spacer 330, and enters the first gas space 321 at one end of the gas space 321. The oxygen then flows over the exposed surface of the first electrode 340, and exits through a port at an opposing end of the gas space 321. The oxygen then exits the system 300 through a gas outlet 362.

According to this embodiment, electrolyte similarly enters the apparatus through an electrolyte input port 370, fills alternating electrolyte spaces 333, and 331, and then exits the system 300 through an electrolyte output port 372. Thus, according to this embodiment electrolyte and oxygen flows are separated from each other.

Figure 4:
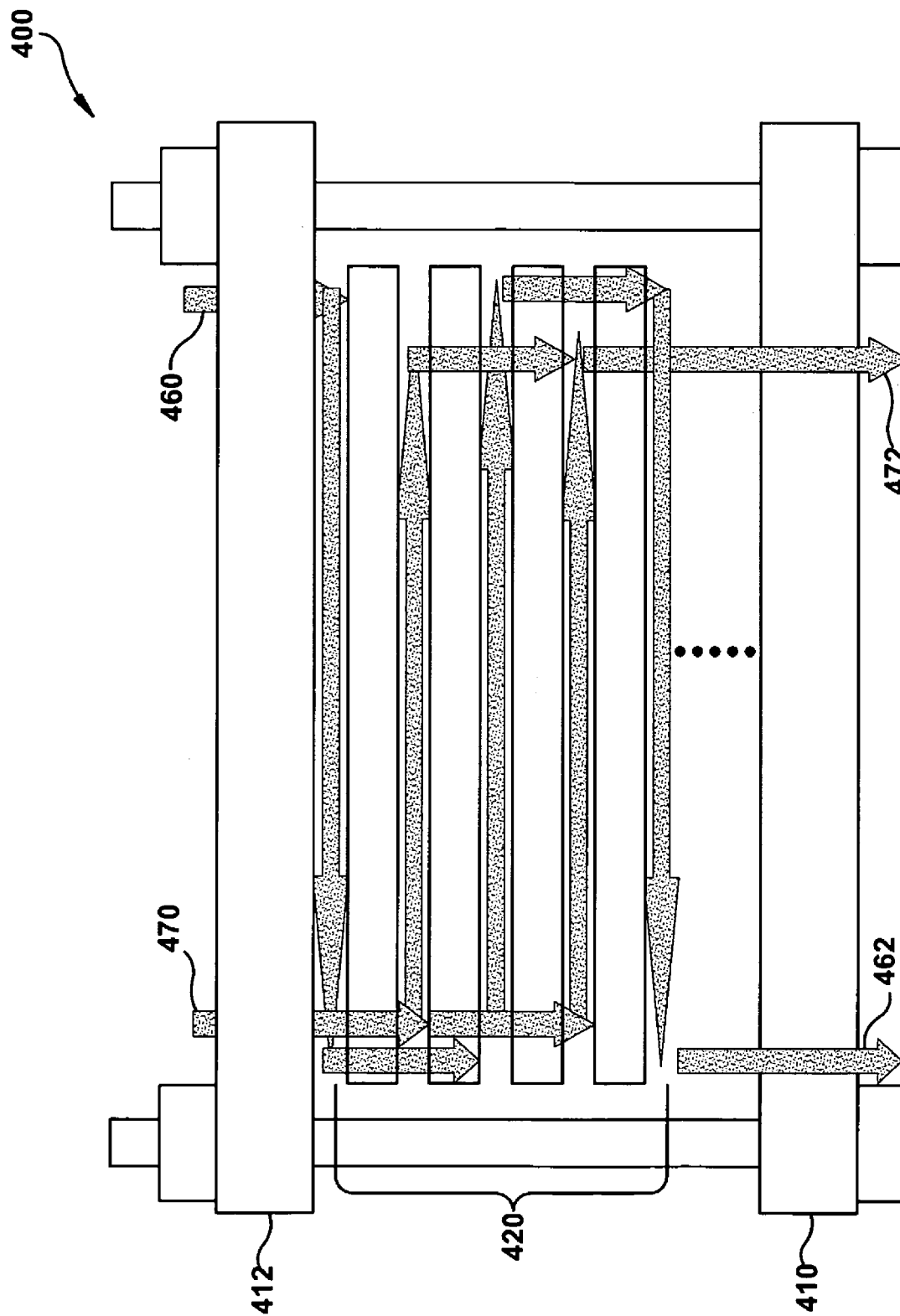
FIG. 4 is a schematic diagram of a fuel cell stack showing the separate flow patterns of oxygen and electrolyte.
Figure 5:
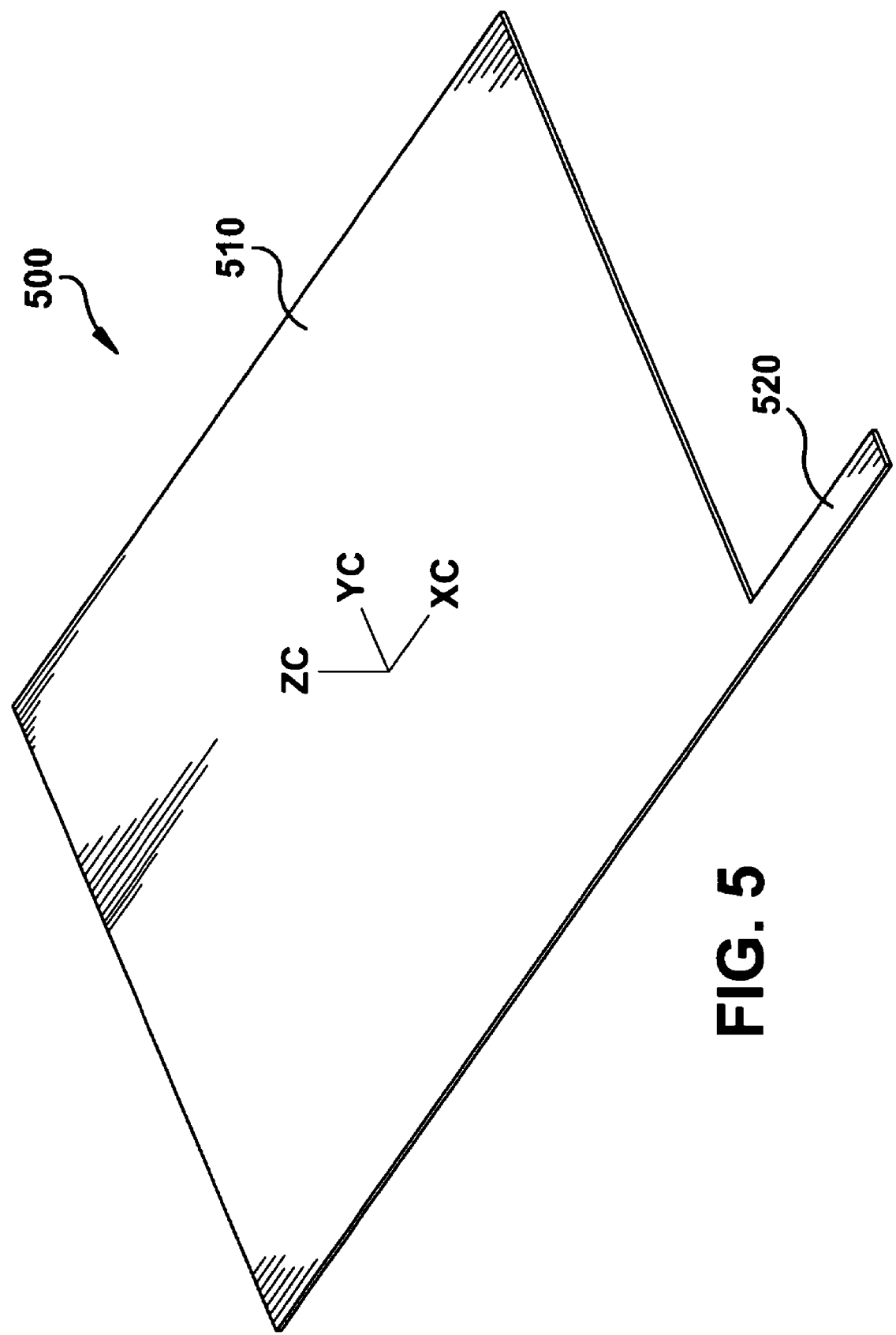
FIG. 5 is a drawing of an embodiment comprising a third electrode.

An apparatus 400 comprising an embodiment of the invention is shown in FIG. 4. The apparatus includes a first end plate 410 and second end plate 412. The second end plate 412 has a gas inlet port 460 spaced from an electrolyte inlet port 470. And, the first end plate 410 has an electrolyte output port 472 spaced from a gas output port 462.

During use, an oxidant (e.g., oxygen) follows a single flow path through the cell body from the oxygen inlet 460 to the oxygen outlet 462. Electrolyte enters a manifold that feeds a plurality of flow paths through the cell body that reconverge at the electrolyte outlet 472. Thus, according to this embodiment, oxygen is in series and the electrolyte is in parallel. In an alternative embodiment, oxygen may be in parallel while electrolyte is in series. In still a further variation, both oxygen and electrolyte may be in parallel. And, in still a further variation, both oxygen and electrolyte may be in series.

Some embodiments may include a third electrode 500. The third electrode may be shaped as a plate. The plate can have a rectangular body 510, and may have a rectangular tab portion 520 protruding from one end of the body 510. The plate has a first surface and an opposing second surface, and is bounded by four side surfaces. The distance between the first surface and the second surface may define a thickness that is greater than about 0.1 millimeter. In one embodiment, the thickness of the plate may be in a range of from about 0.1 millimeter to about 0.5 millimeters, about 0.5 millimeters to about 1 millimeter, from about 1 millimeter to about 1.5 millimeter, from about 1.5 millimeters to about 2 millimeters, from about 2 millimeters to about 2.5 millimeters, from about 2.5 millimeters to about 3 millimeters, from about 3 millimeters to about 3.5 millimeters, from about 3.5 millimeters to about 4 millimeters, from about 4 millimeters to about 4.5 millimeters, from about 4.5 millimeters to about 5 millimeters, from 5 millimeters to about 5.5 millimeters, from about 5.5 millimeters to about 6 millimeters, from 6 millimeters to about 6.5 millimeters, from about 6.5 millimeters to about 7 millimeters, from about 7 millimeters to about 7.5 millimeters, from about 7.5 millimeters to about 8 millimeters, from about 8 millimeters to about 8.5 millimeters, from about 8.5 millimeters to about 9 millimeter, from about 9 millimeters to about 9.5 millimeters, or from about 9.5 millimeters to about 10 millimeters.

The thickness of the tab may be the same as the thickness of the plate. However, in some embodiments the tab thickness may be different from the plate thickness. The third electrode can include one or more conductive or semi-conductive materials. Suitable conductive or semi-conductive materials can include gold, silver, platinum, copper, aluminum, or ferro-based alloy (e.g., steel). Both the anode and the cathode can have a shape similar to that of the third electrode, including the rectangular shape of the electrode and the tab protruding from the electrode. Furthermore, the anode and cathode can be the same materials as that of the third electrode. The shape and form of the electrodes can be selected with reference to the end-use, design parameters, and device properties.

Figure 6:
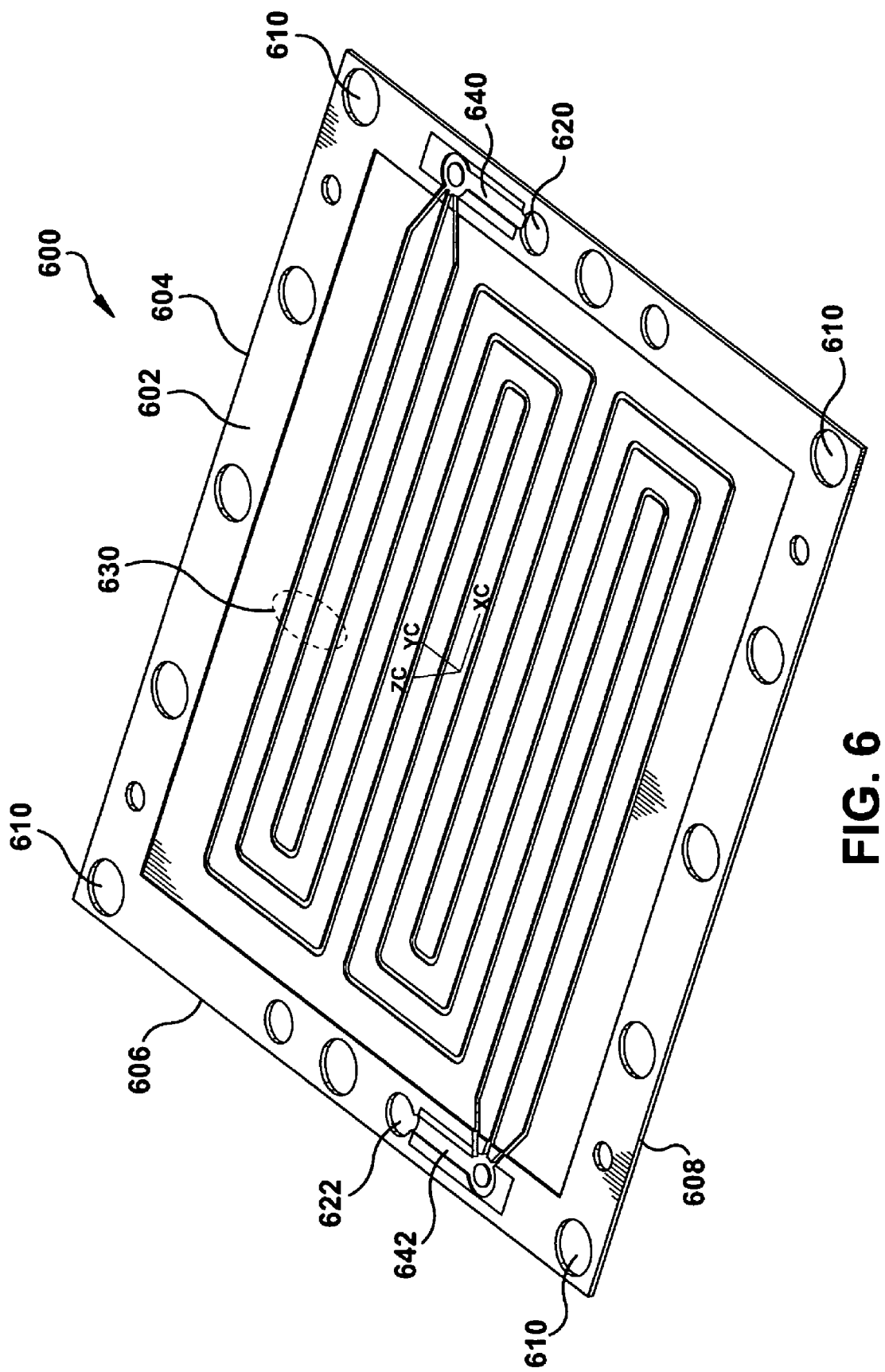
FIG. 6 is a drawing of an embodiment comprising an oxygen or electrolyte plate.

As shown in FIG. 6, a multi-channel plate 600 for use in an embodiment of the invention is shown. The multi-channel plate has a first surface 602 and an opposing second surface 604, and can be used to flow either oxidant or electrolyte, as appropriate for the sandwich layer in the apparatus, across the surface of an adjacent electrode (not shown). A peripheral edge of the plate can define apertures 620, 622 that can function as fluid input and/or output ports. Other apertures are capable of receiving fasteners (not shown), such as bolts. An input port is located at one end of the plate. The port is aligned so as to be in fluid communication with an entry channel 640. The entry channel may be milled into the plate surface. The entry channel defines a flow path from the port to flow channels 630.

In the illustrated embodiment there are three flow channels. The flow channels may be, for example, milled into the plate surface. The flow channels can define a pattern that is selected to provide, for example, a desired residence time contacting an adjacent electrode or a determined surface area. According to one embodiment, the flow channels extend in a plane from the entry channel in a parallel relation to each other, turn a perpendicular direction in the plane, and continue back and forth across the surface of the plate. The flow channels can turn so that they form a snaking pattern covering a portion of the plate to terminate at an output manifold 642. The output manifold 642 is in fluid communication with an output port 622.

Channel plates can be formed from materials selected based on whether the channel plates will transport oxygen or electrolyte. Suitable materials are corrosion-resistant material to the transport fluid. Examples of such materials can include metals and polymeric materials. Suitable metals can include noble metals, nickel alloys, stainless steel alloys. Examples of suitable metals include gold, silver, platinum, nickel, and palladium. Suitable polymeric materials can include polyolefins, polycarbonate, polyimide, polyetherimide, poly phenylene oxide or poly arylene oxide, or phenolic polymers. The polymeric materials may be fluorinated. Suitable olefins can include polyethylene, polypropylene, and polyphenols.

Figure 7:
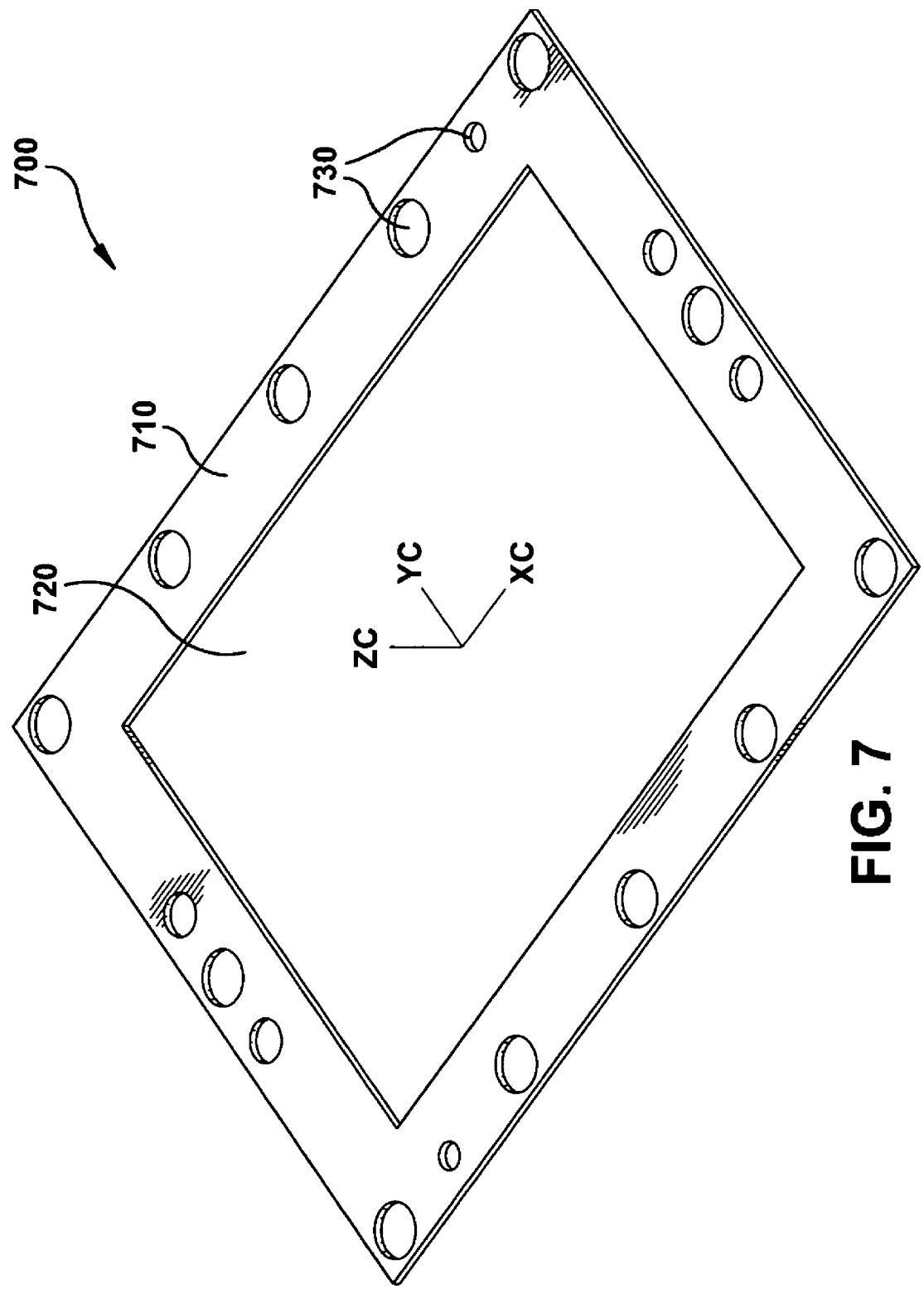
FIG. 7 is a drawing of an embodiment comprising a gasket or a spacer.
Figure 8:
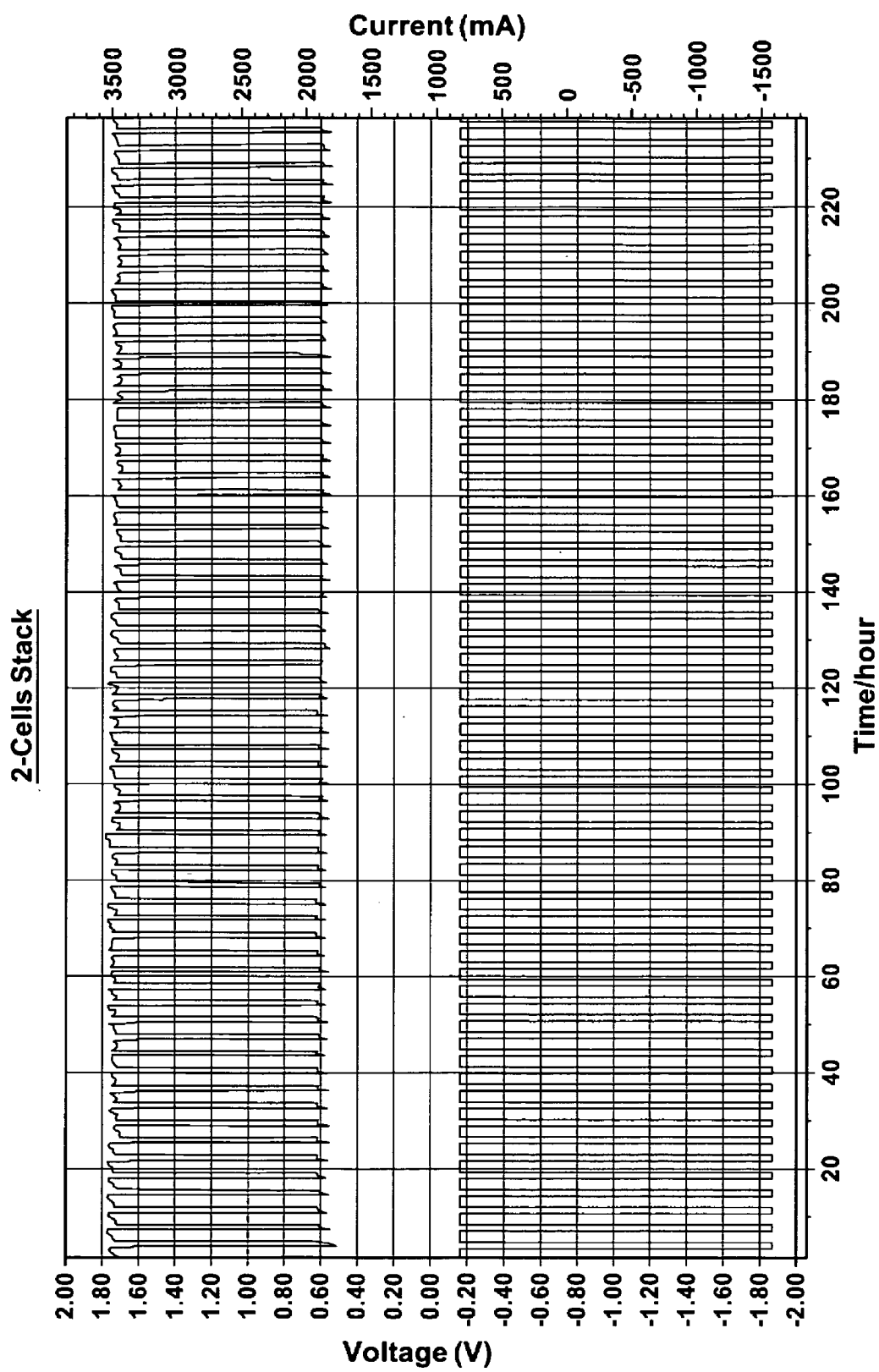
FIG. 8 is a graphic plot showing the discharge profile of a two-cell stack.

A gasket/spacer 700 according to an embodiment of the invention is shown in FIG. 7. The space can be of rectangular shape having a cut-out portion. The cut-out portion defines a fluid gap 720 in cooperation with an electrode surface (not shown). According to one embodiment, the perimeter of a picture frame-type gasket/spacer can have a plurality of holes 730 drilled or cut therein, which holes are capable of receiving fluids and/or fasteners such as bolts.

Gaskets and spacers may form seals by elastic compression or inelastic compression. For elastic compression, suitable gasket and spacer material can include elastomers. Suitable elastomers may include isoprene, neoprene, butyl rubber, styrene butadiene rubber, silicone, or elastomeric polyolefin. Suitable polyolefin can include polyisobutylene, polyethylene or polypropylene. The polyolefin can be halogenated to form tetrafluoropolyethylene, polyvinylidene fluoride, or perfluorinated polyethylene.

According to some embodiments, a fuel cell component may derive hydrogen from a solid-state material and water or from another hydrogen source. A porous metal hydride anode of the fuel cell may be operable for conducting electrons freed from the solid-state hydrogen storage material so that they can be supplied to current collectors. The porous metal hydride anode may include pores, and interstitial spaces that are operable for storing water and electrolyte. The porous metal hydride anode may have an improved charge efficiency occurring as a result of reducing electrolyte transfer. Porosity may create a volume within the anode for storage of water and/or electrolyte, which may be effective for off-setting water losses due to evaporation and consumption. For example, water may be retained in a porous metal hydride anode fabricated using sintered zinc powder.

A fuel cell cathode may be further operable for conducting electrons back from an external circuit to a catalyst, where they combine with water and oxygen to form hydroxide ions. The catalyst may be operable for facilitating the reaction between hydrogen and oxygen. The catalyst may comprise materials including, but not limited to, platinum, palladium and ruthenium, which surface the separator membrane. The surface of the platinum may be such that a maximum amount of the surface area may be exposed to oxygen. Oxygen molecules can dissociate into oxygen atoms in the presence of the catalyst and accept electrons from the external circuit while reacting with hydrogen atoms, thus forming water. In this electrochemical reaction, a potential develops between the two electrodes.

A hydrogen-generating component of a hybrid system provides energy storage capacity and shares the porous anodic electrode of the fuel cell component. The hydrogen-generating component further may include an electrode and a separator membrane. The structure of the hydrogen-generating component may be a construction including one or more identical cells, with each cell including at least one each of an electrode, anodic electrode, and separator membrane. The anodic porous electrode may include a hydrogen storage material and may perform one or more functions, such as: (1) a solid-state hydrogen source for the fuel cell component; (2) an active electrode for the hydrogen-generating component; and (3) a portion or all of the electrode functions as an anode of the anode component.

The electrochemical hydrogen-generating component has storage characteristics characterized by being capable of accepting direct-current (DC) electrical energy in a charging phase to return the solid-state material to a hydrogen-rich form, retaining the energy in the form of chemical energy in the charge retention phase, and releasing stored energy upon a demand by the fuel cell component in a discharge phase. The hydrogen-generating component may repeatedly perform these three phases over a reasonable life cycle based on its rechargeable properties. The electrical energy may be supplied from an external source, a regenerative braking system, as well as any other source capable of supplying electrical energy. The solid state material may be recharged with hydrogen by applying the external voltage.

Suitable metal hydrides may include one or more of $AB_5$ alloy, $AB_2$ alloy, AB alloy, $A_2B$ alloy, $A_2B_{17}$ alloy, or $AB_3$ alloy. The $AB_5$ alloy may include, but is not limited to, $LaNi_5$, $CaNi_5$, or $MA_xCB_yC_z$, wherein M may be a rare earth element component; A is one of the elements Ni or Co; B may be one of the elements Cu, Fe or Mn; (it is noted that as used herein "C" does not stand for elemental carbon) C may be one of the elements Al, Cr, Si, Ti, V or Sn. And, x, y and z satisfy one or more of the following relations, wherein $2.2 \leq x \leq 4.8$, $0.01 \leq y \leq 2.0$, $0.01 \leq z \leq 0.6$, or $4.8 \leq x+y+z \leq 5.4$. Suitable examples of $AB_2$ type alloys include, but are not limited to, Zr—V—Ni, Zr—Mn—Ni, Zr—Cr—Ni, TiMn, and TiCr. Suitable AB type alloys include, but are not limited to, TiFe and TiNi. Suitable $A_2B$ type alloys include, but are not limited to, $Mg_2Ni$. Suitable $A_2B_{17}$ type alloys include, but are not limited to, $La_2Mg_{17}$. Suitable $AB_3$ type alloys include, but are not limited to, $LaNi_3$, $CaNi_3$, and $LaMg_2Ni_9$.

In one embodiment, the anode material may include catalyzed complex hydrides. Suitable complex hydrides may include one or more of borides, carbides, nitrides, aluminides, or silicides. Suitable examples of complex catalyzed hydrides may include an alanate. Suitable alanates may include one or more of $NaAlH_4$, $Zn(AlH_4)_2$, $LiAlH_4$ and $Ga(AlH_4)_3$. Suitable borohydrides may include one or more of $Mg(BH_4)_2$, $Mn(BH_4)_2$ or $Zn(BH_4)_2$. In one embodiment, the anode material may include complex carbon-based structures or boron-based structures. Such complex carbon-based structures may include fullerenes, nanotubes, and the like. Such complex boron-based structures may include boron nitride (BN) nanotubes, and the like.

The metal hydride powder may be mixed with a conductive additive. Suitable conductive additives may include nickel or cobalt.

Sacrificial additives may be selected to control the pore volume and/or the pore configuration. For example, a weight of sacrificial additives may be selected to control pore volume. That is, the more of the sacrificial additive used, the more pore volume is generated when the sacrificial additive is removed. As another example, a type of sacrificial additive may be selected to control pore configuration. That is, the configuration of the sacrificial additive selected may control the pore configuration when the sacrificial additive is removed. The configuration may include such attributes as interconnectivity, diameter, length, spacing, and the like.

A determined amount of sacrificial additives may be added to form a mixture. The amount may be determined with reference to the desired pore volume of the end product. That is, an amount of the sacrificial additives having a known volume may be used to produce a corresponding desired volume in the end product. Suitable sacrificial additives may include one or more of zinc, aluminum, nickel, or carbon. In one embodiment, the sacrificial additives may include one or more of zinc acetate, aluminum acetate, or nickel acetate. In one embodiment, the sacrificial additives may include a carbonate, such as $NH_4HCO_3$.

The mixture may be pasted, formed, and/or pressed to form an anode electrode precursor structure. The anode electrode precursor structure may be heated. The heating may calcine and/or sinter the precursor structure to form an electrode main body. The sacrificial additives may be partially or entirely removed during, or after, the sintering and/or calcining process. If removed during, the heat of calcining and/or sintering may vaporize the sacrificial additives. If removed after, the sacrificial additives may be solvated or the like. Excipient salts may be useful for solvated removal after heating. The removal of the sacrificial additives may leave a porous metal anode electrode main body having a determined pore volume.

In one embodiment, the sacrificial additive may be selected to have an effect on the inner surface of the pores formed by the removal of the sacrificial additive. In such an instance, the composition of the sacrificial additive may be entirely or partially devoted to affecting the surface character of the pore. For example, if a metal particle is added to the sacrificial additive, which is otherwise a volatile low polymer, heating to vaporize the sacrificial additive may release the metal particle from the matrix of the sacrificial additive and the metal particle may deposit on the pore inner surface. Thus, the pore inner surface composition and character may be controlled. In one embodiment, a material is deposited on the pore inner surface that readily forms surface hydroxyl groups. The surface hydroxyls may increase the hydrophilicity of the pores and facilitate transport of polar liquids therethrough. In one embodiment, a selected catalyst may be deposited on the pore inner surface. It may be desirable to coat the outer surface of the sacrificial additive, which will contact and define the inner surface of the pore, with the material to be deposited.

During use, the pores may receive and store water and/or electrolyte. Suitable electrolytes may include aqueous KOH. The anode electrode main body may have a pore volume capable of storing quantities of water and electrolyte suitable for use in a rechargeable fuel cell or a metal hydride based battery. The pore volume may be greater that about 5 percent of the volume of the anode electrode main body. In one embodiment, the pore volume may be in a range of from about 5 percent to about 10 percent, from about 10 percent to about 15 percent, from about 15 percent to about 20 percent, from about 20 percent to about 25 percent, from about 25 percent to about 35 percent, from about 35 percent to about 45 percent, from about 45 percent to about 55 percent, or from about 55 percent to about 75 percent of the volume of the anode electrode main body.

Embodiments of the porous metal hydride anode may have a relatively improved charge efficiency resulting from a reduced electrolyte transfer. Electrolyte transfer may refer to the tendency of the electrolyte to migrate from the positive end proximate the cathode to the negative end proximate the anode during use. In a stack, particularly, the end cells may lose performance relative to the centrally located cells due to such migration, which may cause a concentration imbalance. By providing a physical obstacle to flow, in the form of a tortuous path and constricted pathways, electrolyte migration may be controlled, and thereby electrolyte transfer may be reduced.

Thus, some porous metal hydride electrode embodiments can store additional KOH electrolyte and can serve as anodes after being positioned with a membrane separator, air cathode electrode and other components and assembled into a rechargeable fuel cell. The additional quantity of KOH electrolyte stored in porous anode embodiments can reduce the water management concerns caused by the consumption and evaporation of water during the charge and discharge processes. At the same time, the use of porous anode embodiments in a rechargeable fuel cell improves the energy conversion and energy transfer efficiency of the fuel cell. The porous anode is also usable in fuel cells that are not rechargeable.

In one aspect, an embodiment may include a method for making a porous anode for use in a rechargeable fuel cell. The method may include, preparing a mixture. The mixture may include metal hydride and one or more sacrificial additives. For some embodiments, a gel binder may be added as part of the sacrificial additive. The additives may be sacrificial insofar as they may be subsequently removed during sintering and/or calcining, completely or in part, to form the pores of the porous anode.

The metal hydride and sacrificial additive mixture may be formed into a porous electrode main body, or green body. The green body may be sintered. Sintering may obtain a stable and strong connection among the metal hydride particles. Hydrogen gas may be introduced during sintering to reduce or prevent metal hydride oxidation. The sacrificial additive may be introduced during mixing, and may be removed during sintering and/or calcining. Alternatively, the sacrificial additive may be removed by other removal steps without sintering.

The metal hydride and sacrificial additive mixture may be paste sintered. In this paste sintered embodiment, a mixture of metal hydride and sacrificial additive may coat a metal foam plate, and may be paste sintered at a relatively high temperature.

In one embodiment for paste sintering, a nickel metal hydride may be mixed with a zinc sacrificial additive, forming a metal hydride mixture. The metal hydride mixture may be applied to a nickel foam. The wet coated nickel foam plate may be dried to form an electrode main body. The main body may be sintered at about 800 degrees Celsius. In one embodiment, the metal hydride mixture may be mixed further with a binder. Suitable binders may include styrene butadiene rubber and nickel. The mixed composition may be cold pressed onto the nickel foam plate to form a cold pressed assembly. The cold press assembly may be cold press sintered at a lower temperature than the temperature used for paste sintering.

The temperature range for paste sintering may be from about 100 degrees Celsius to about 800 degrees Celsius. The temperature range for cold press sintering may be in a range of from about 100 to about 300 degrees Celsius. Binders such as gel binders, styrene butadiene rubber, and carboxymethyl cellulose may be added to the cold press assembly and may be sintered at a temperature in a range of from about 500 degrees Celsius to about 800 degrees Celsius. Sacrificial additives may be added to the mixture before it is formed green structure, which may be further processed to become the electrode main body.

The sintered anodes may be treated to remove sacrificial additives. The treatment may include sonication, acidification, solvation, or dissolution by heat decomposition. Additive removal schemes for removing additives in an alkaline environment with sonication include treating with zinc or aluminum as follows:

$$Zn+2OH^- \rightarrow ZnO_2^- + H_2$$

$$Al+2OH^- \rightarrow AlO_2^- + H_2$$

The treatment with an alkaline material forms Zn and Al ionic species, which may be washed away.

Additive removal schemes for removing additives in an acidic environment with sonication may include treating with zinc or aluminum or ammonium carbonate as follows:

$$Zn+2H^+ \rightarrow Zn^{2+} + H_2$$

$$Al+2H^+ \rightarrow Al^{3+} + H_2$$

When Zn and Al are exposed to an acidic environment, zinc ion and aluminum ion, respectively, may be formed with hydrogen gas.

In one method embodiment, a sacrificial additive of aluminum powder may be mixed into anodic metal hydride material to form a mixture. The mixture may be coated onto a nickel foam and pressed to form an anode having a thickness of, in one embodiment, about 3 mm. The anode may be soaked in an alkaline solution to remove the aluminum. The soaked anode may be sintered in a mixture of argon gas and hydrogen gas, for some embodiments. For other embodiments, the anode may not be sintered.

Another method embodiment may include mixing $NH_4HCO_3$ into anodic metal hydride material, coating the mixture onto nickel foam and pressing to form an anode. In one embodiment, the thickness of an anode may be about 3 mm. The pressed anode may be heated at a temperature of about 60 degrees Celsius to remove the $NH_4HCO_3$ with the removal scheme below.

$$NH_4HCO_3 \rightarrow NH_3 + CO_2 + H_2O$$

Another method may include mixing nickel acetate into anodic metal hydride material, coating the mixture onto a nickel foam plate to form an anode. The anode may be heated to about 500 degrees Celsius to remove acetate ions, and form a porous anode with the removal scheme below. In another embodiment, the anode may be pressed to form an anode having thickness of about 3 millimeters (mm). The pressed anode may be heated to about 500 degrees Celsius to remove acetate ions, for example with the removal scheme below.

$$Ni(CH_3COO)_2 + H_2 \rightarrow Ni + C + CO_2 + H_2O$$

The pore volume of the porous anode may be determined by selecting a quantity of sacrificial additive, such as aluminum and zinc that produce the pore volume. The mechanical strength of the porous anode may be determined by selecting the pressure and time of sintering. The sintering effect may be affected by controlling the temperature and the time of sintering. The sintering process may destroy or chemically alter the binders, such as polytetrafluoroethylene and carboxymethyl cellulose.

According to some embodiments hydrogen and/or oxygen may be required by a fuel cell component to produce electrical energy. A rechargeable fuel cell may be operated with solid-state materials capable of hydrogen storage, such as, but not limited to, conductive polymers, ceramics, metals, metal hydrides, organic hydrides, a binary or other types of binary/ternary composites, nanocomposites, carbon nanostructures, hydride slurries and any other advanced composite material having hydrogen storage capacity.

Recharging of a rechargeable fuel cell may produce water and/or oxygen, which may be recycled. The electrochemical system may require cooling and management of the exhaust water. The water produced by the fuel cell component may recharge the solid-state fuel. For some embodiments, the only liquid present in the rechargeable fuel cell may be water or water-based solutions. Water management in the non-woven separation membrane may be useful. Because the membrane may function better if hydrated, the fuel cell component may operate under conditions where the water by-product does not evaporate faster than it may be produced. The porous metal anode embodiments described herein may aid in the maintenance of membrane hydration.

The rechargeable fuel cell embodiment described herein applies to power generation in general, transportation applications, portable power sources, home and commercial power generation, large power generation and to any other application that would benefit from the use of such a system.

While a fuel cell/hydrogen generator hybrid design is shown, other rechargeable fuel cell embodiments may include the porous metal hydride anode. The rechargeable fuel cell described may be operable for converting electrical energy into chemical energy, and chemical energy into electrical energy.

The third electrode may include a material with a low oxygen evolution over-potential. The third electrode may include one or more ferro-based alloys. Suitable ferro-based alloys may include stainless steel. Other examples of suitable materials may include one or more of cadmium, palladium, lead, gold, or platinum. The material may be configured to increase surface area, such as by foaming. A suitable example would be a nickel-based foam. Foams may enhance an ability of storing electrolyte solution within the volume of its pores, may provide an increased surface area for reaction, and may provide for diffusion control.

Applying a voltage between the anode and the third electrode of the cell and reversing the electrochemical reaction may recharge an electrically rechargeable fuel cell or metal/air battery. During recharging, the cell may generate oxygen. Generated oxygen may be released to the atmosphere through the air permeable cathode if desired.

The mechanism of a rechargeable fuel cell or metal/air battery may be shown below.

In charging process:
negative electrode: $4M + 4H_2O + 4e \rightarrow 4MH + 4OH^-$
third electrode: $4OH^- \rightarrow O_2 + 2H_2O + 4e$
total electrolysis reaction: $4M + 2H_2O \rightarrow 4MH + O_2$ In discharging process:
negative electrode: $4MH + 4OH^- + 4e \rightarrow 4M + 4H_2O$
positive electrode: $O_2 + 2H_2O + 4e \rightarrow 4OH^-$
total cell reaction: $4MH + O_2 \rightarrow 4M + 2H_2O$ The cathode may be used during the discharge cycle, but may be inefficient in recharging the cell. Further, the cathode may deteriorate quickly when used to recharge. Thus, in some embodiments a third electrode may be utilized as a separate oxygen generation electrode. According to some embodiments, a third electrode may be utilized to extend the cycle life over traditional structures by chemically and mechanically protecting the cathode from degradation during recharge. The charge process takes place between the anode and the third electrode. The discharge process takes place between the anode and the cathode. Therefore, the cathode can be free from damage during the oxygen evolution reaction.

One embodiment may include a galvanic cell 1003 in combination with a gas scrubber 1000. The galvanic cell unit may be a rechargeable fuel cell unit, alkaline fuel cell or metal/air battery, for example.

One such embodiment may include a first shutter support layer 1017, which provides a first shutter 1015 that may be adjacent to ambient air. The first shutter 1015 controls access and flow of air or oxygen into and out of the device. An active material layer 1009 may be positioned below or underneath the first shutter support layer 1017. The active material layer may include an active material that can chemically or physically bind the gas to be isolated, such as carbon dioxide. The active material layer may be coupled to a resistance coil 1011 that can be thermally or electrically activated to reverse the binding of the target gas, such as the release of bound carbon dioxide. The resistance coil may also be fitted with a temperature control 1013. A second shutter support layer 1005 may include a second shutter 1007, which controls the access and flow of the filtered air or oxygen to an electrochemical cell 1003.

Oxygen that is generated during a charging process can help to release the bound carbon dioxide from the active material. Gaskets 1025 and through bolts 1021 support the components of the device within a housing 1019. The positioning and control of the shutters, and the choice or selection of active materials, may allow for management of potentially disrupting target gases. Target gases may include one or more of carbon dioxide, sulfur oxides, or nitrogen oxides. Air or oxygen may be scrubbed of the target gas prior to contact with the electrolyte, and/or the electrodes, of the galvanic cell unit 1003. The thermal or electric control of the resistance coil regenerates the active material layer. Such control may reduce or eliminate periodic maintenance, such as the replacement and/or replenishment of active materials.

The active material layer may include one or more active materials that are capable of chemically and/or physically binding a target gas. Suitable active materials may include one or more of amines, amidines, or polymers or composites that include such nitrogen-based functionality and the like. Copolymers and blends of the active molecules or polymers can also be utilized in some embodiments. In one embodiment, the active material may include one or more of an amine, a pyrimidine, or an amide functional group.

Suitable amines may include one or more alkyl ethanolamine. Suitable alkyl ethanolamine may include one or more of triethanolamine (TEA), monoethanolamine (MEA), diethanolamine (DEA), or methyl diethanolamine (MDEA). Other suitable amines may include propanolamines, or other longer chain alkanes having a hydroxyl functionality and an amine functionality. Both primary and secondary amines may be utilized. In one embodiment, the active material may include polyamine functionality. Suitable amines may be commercially obtained at Dow Chemical (Midland, Mich.). Unless specified otherwise, all ingredients are commercially available from such common chemical suppliers as Alpha Aesar, Inc. (Ward Hill, Mass.), Sigma-Aldrich Company (St. Louis, Mo.), and the like.

Suitable amidines may include one or more of 1,8-diazabicyclo[5.4.0]-undec-7-ene (DBU), tetrahydropyrimidine (THP), N-methyltetrahydropyrimidine (MTHP), or polystyrene, polymethacrylate, polyacrylate etc., modified by DBU, THP or MTHP for example. In one embodiment, the amidine may include one or more of a bis-amidine, tris-amidine, or tetra-amidine, or a salt of any of these.

In one embodiment, the active polymer may be produced through radical polymerization, cationic polymerization, anionic polymerization, group transfer polymerization, ring-opening polymerization, ring-open metathesis polymerization, coordination polymerization, condensation polymerization, etc. The active polymer may be also produced by modification of a premade polymer structure using suitable active molecules. In one embodiment, the amidine may include a compound having the general formula X—Y(Z)n. In this formula, X is a moiety having a structure as shown in Formula I:

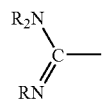

Formula I wherein each R is, independently, hydrogen or an optionally substituted alkyl, alkenyl, aryl, alkaryl, or alkenylaryl group. Y is a bond or a linking group. Z is hydrogen or a second moiety also having a structure as shown by Formula I, which may be the same or different than X. The variable n is an integer from 1 to 3.

Alkyl includes an aliphatic hydrocarbon group that may be linear or branched having from 1 to about 15 carbon atoms, in some embodiments 1 to about 10 carbon atoms. Branched includes that one or more lower alkyl groups such as methyl, ethyl, or propyl are attached to a linear alkyl chain. Lower alkyl includes having 1 to about 6 carbon atoms in the chain, which may be linear or branched. One or more halo atoms, cycloalkyl, or cycloalkenyl groups may be a substitute for the alkyl group.

Alkenyl includes an aliphatic hydrocarbon group containing a carbon-carbon double bond and which may be straight or branched having 2 to about 15 carbon atoms in the chain. Preferred alkenyl groups have 2 to about 10 carbon atoms in the chain, and more preferably 2 to about 6 carbon atoms in the chain. Lower alkenyl includes 2 to about 4 carbon atoms in the chain. The chain may be straight or branched. The alkenyl group may be substituted by one or more halo atoms, cycloalkyl, or cycloalkenyl groups. Cycloalkyl includes a non-aromatic mono- or multicyclic ring system of about 3 to about 12 carbon atoms. Exemplary cycloalkyl rings include cyclopentyl, cyclohexyl, and cycloheptyl. The cycloalkyl group may be substituted by one or more halo atoms, methylene, alkyl, cycloalkyl, heterocyclyl, aralkyl, heteroaralkyl, aryl or heteroaryl. Hetero includes oxygen, nitrogen, or sulfur in place of one or more carbon atoms. Cycloalkenyl includes a non-aromatic monocyclic or multicyclic ring system containing a carbon-carbon double bond and having about 3 to about 10 carbon atoms. The cycloalkenyl group may be substituted by one or more halo atoms, or methylene, alkyl, cycloalkyl, heterocyclyl, aralkyl, heteroaralkyl, aryl, or heteroaryl groups.

Aryl includes an aromatic carbocyclic radical containing about 6 to about 12 carbon atoms. Exemplary aryl groups include phenyl or naphthyl optionally substituted with one or more aryl group substituents which may be the same or different, where "aryl group substituent" includes hydrogen, alkyl, cycloalkyl, optionally substituted aryl, optionally substituted heteroaryl, aralkyl, aralkenyl, aralkynyl, heteroaralkyl, heteroaralkenyl, heteroaralkynyl, hydroxy, hydroxyalkyl, alkoxy, aryloxy, aralkoxy, carboxy, acyl, aroyl, halo, nitro, cyano, carboxy, alkoxycarbonyl, aryloxycarbonyl, aralkoxycarbonyl, acylamino, aroylamino, alkylsulfonyl, arylsulfonyl, and other known groups. Alkaryl includes an aryl-alkyl-group in which the aryl and alkyl are as previously described. Alkenylaryl includes an aryl-alkenyl-group in which the aryl and alkenyl are as previously described.

In the general formula X—Y(Z)$_n$, Y can be a bond or a linking group R', which may be, or include, a hetero-atom such as oxygen, sulfur, phosphorous, or nitrogen, and the like.

The linking group R' may be an alkyl, alkenyl, aryl, or alkaryl group having from 1 to about 15 carbon atoms, which may be linear or branched, and which may be non-fluorinated, fluorinated, or perfluorinated. n is greater than 1. In one embodiment, the amidine may include one or more carboxylate salts of an amidine, which amidine and/or salt optionally can be fluorinated or perfluorinated.

The target gas (carbon dioxide) may react with the active materials to form such products as zwitterions adducts and ammonium carbamate, for example. Active materials may be selected based on the ability to physically bind a target gas, which if carbon dioxide may include carbon fiber compounds and their composites. For example, carbon fiber composite molecular sieve (CFCMS) can adsorb carbon dioxide. Other suitable materials for physical binding of a target gas may include carbon nanotubes, buckyballs or fullerenes, porous ceramics, zeolites, and the like.

Such active materials can adsorb carbon dioxide in low temperatures during the discharge process of the electrochemical cell by either a chemical reaction, physical adsorption or both. The active materials can be regenerated within the active material layer by applying a thermal treatment in the range of greater than about 65 degrees Celsius to the resistance coil during the charge period of the electrochemical cell. In one embodiment, the thermal treatment may be less than about 120 degrees Celsius. Further, the temperature range may be from about 65 degrees Celsius to about 80 degrees Celsius, from about 80 degrees Celsius to about 100 degrees Celsius, from about 100 degrees Celsius to about 110 degrees Celsius, or from about 110 degrees Celsius to about 120 degrees Celsius. Alternatively or additionally, applying a low voltage to the resistance coil may regenerate the active materials.

The embodiments described herein are examples of compositions, structures, systems and methods having elements corresponding to the elements of the invention recited in the claims. This written description enables one of ordinary skill in the art to make and use embodiments having alternative elements that likewise correspond to the elements of the invention recited in the claims. The scope thus includes compositions, structures, systems and methods that do not differ from the literal language of the claims, and further includes other compositions, structures, systems and methods with insubstantial differences from the literal language of the claims. While only certain features and embodiments have been illustrated and described herein, many modifications and changes may occur to one of ordinary skill in the relevant art. The appended claims are intended to cover all such modifications and changes.

What is claimed is:

1. An apparatus, comprising:
a fuel cell comprising an electrode having a surface; and
at least one spacer secured to the electrode surface, wherein the spacer has a surface that defines a channel that extends from a first port across the spacer surface to a second port, and
the first port is configured to receive a fluid and provide the fluid to the channel, the channel is configured to allow the fluid to flow therethrough to the second port, and the second port is configured to receive the fluid from the channel, and
the channel has a portion that opens toward the electrode such that the fluid is in contact with the electrode surface as the fluid flows from the first port through the channel to the second port;
wherein the electrode is one of a plurality of electrodes, the spacer is one of a plurality of spacers, and the fluid is one of two fluids, a first fluid being an oxidant bearing gas and a second fluid being an electrolyte solution; and
wherein at least one of the plurality of electrodes is a cathode, at least one of the plurality of electrodes is a metal hydride anode, and at least one of the plurality of electrodes is a third electrode, a first spacer of the plurality of spacers is in contact with the cathode and has a channel to carry the first fluid and a second spacer of the plurality of spacers is in contact with the third electrode and has a channel to carry the second fluid.

2. The apparatus as defined in claim 1, wherein at least two of the plurality of electrodes are cathodes and the first spacer is in contact with a first one of the cathode and has a channel to carry the first fluid from a first spacer first port across the first cathode surface to a first spacer second port, and the second spacer is in contact with a second one of the cathodes and has a first port to receive the first fluid from the first spacer and a channel to carry the first fluid from the second spacer first port across the second cathode surface to a second spacer second port.

3. The apparatus as defined in claim 1, wherein at least two of the plurality of electrodes are third electrodes and the first spacer is in contact with a first one of the third electrodes and has a channel to carry the second fluid from a first spacer first port across the first third electrode surface to a first spacer second port, and the second spacer is in contact with a second one of the third electrodes and has a first port to receive the second fluid from the first spacer and a channel to carry the second fluid from the second spacer first port across the second third electrode surface to a second spacer second port.

4. The apparatus as defined in claim 1, wherein at least two of the plurality of electrodes are cathodes and the first spacer is in contact with a first one of the cathode and has a channel to carry the first fluid from a first spacer first port across the first cathode surface to a first spacer second port, and the second spacer is in contact with a second one of the cathodes and has a first port to receive the first fluid from the first spacer and a channel to carry the first fluid from the second spacer first port across the second cathode surface to a second spacer second port; and wherein at least two other of the plurality of electrodes are third electrodes and a third spacer is in contact with a first one of the third electrodes and has a channel to carry the second fluid from a third spacer first port across the first third electrode surface to a third spacer second port, and a fourth spacer is in contact with a second one of the third electrodes and has a first port to receive the second fluid from the third spacer and a channel to carry the second fluid from the fourth spacer first port across the second third electrode surface to a fourth spacer second port.

5. The apparatus as defined in claim 1, wherein the channel is multi-channeled having a common manifold at the first port and the second port.

6. The apparatus as defined in claim 1, wherein the channel has at least one turn in a plane defined by the spacer surface that is equal to or greater than 90 degrees.

7. The apparatus as defined in claim 1, wherein the channel has at least one turn in a plane defined by the spacer surface that is equal to or greater than 180 degrees.

8. The apparatus as defined in claim 1, wherein the channel extends for a sufficient distance that the surface area of the open portion of the channel is about the same as the surface area of the electrode in contact thereto.

9. The apparatus as defined in claim 1, wherein the channel extends for a sufficient distance that the residence time of the fluid flowing through the channel is greater than the residence time of the fluid in contact with the electrode that has a straight line flow path across the electrode surface.

10. The apparatus as defined in claim 1, wherein the channel is of sufficient width and length that the surface area of the open portion of the channel is about the same as the surface area of the electrode in contact thereto.

11. A device, comprising:
a fuel cell having a plurality of electrodes spaced apart and electrically insulated from each other, except that the plurality of electrodes are in electrical communication through at least one electrochemical reaction, wherein at least one of the plurality of electrodes is a cathode, at least one of the plurality of electrodes is a metal hydride anode, and at least one of the plurality of electrodes is a third electrode;
an electrical insulator that is electrically isolating one of the plurality of electrodes from another of the plurality of electrodes;
means for defining at least one liquid electrolyte flow path, wherein a liquid electrolyte disposed therein is in electrochemical communication with at least one third electrode, and wherein the at least one liquid electrolyte flow path is in fluid communication with at least one electrolyte input port and at least one electrolyte output port; and
means for defining at least one gaseous flow path, wherein a gas disposed therein is in electrochemical communication with at least one cathode, and wherein the at least one gaseous flow path is in fluid communication with at least one gas input port and at least one gas output port, and wherein the gaseous flow path is separate from, and not in fluid communication with, the electrolyte flow path.

12. The device as defined in claim 11, wherein means for defining at least one gaseous flow path and the means for defining at least one electrolyte flow path comprise a material that is selected from the group consisting of gold, silver, platinum, palladium, isoprene, neoprene, butyl rubber, styrene butadiene rubber, silicones, tetrafluoropolyethylene, polyvinylidene fluoride, perfluorinated polyethylene, polyethylene, and polypropylene.

13. The device as defined in claim 11, wherein the electrical insulator comprises a polymeric material, a cer-met material, or a ceramic material.

14. The device as defined in claim 11, wherein one or more of the plurality of electrodes comprise one or more material selected from the group consisting of gold, platinum, silver, palladium, ruthenium, ferro-based alloys, copper, aluminum, nickel, nickel foam cadmium, and lead.

15. The device as defined in claim 11, further comprising an electrolyte selected from the group consisting of potassium hydroxide, and sodium hydroxide.

16. The device as defined in claim 11, wherein the gas comprises oxygen.

17. The device as defined in claim 11, wherein the device further comprises a gas scrubber that is capable of reducing the amount of carbon dioxide in a flow of air in contact therewith.

* * * * *

UNITED STATES PATENT AND TRADEMARK OFFICE
CERTIFICATE OF CORRECTION

PATENT NO. : 7,985,505 B2  Page 1 of 1
APPLICATION NO. : 11/640014
DATED : July 26, 2011
INVENTOR(S) : Yang et al.

Figure 9:
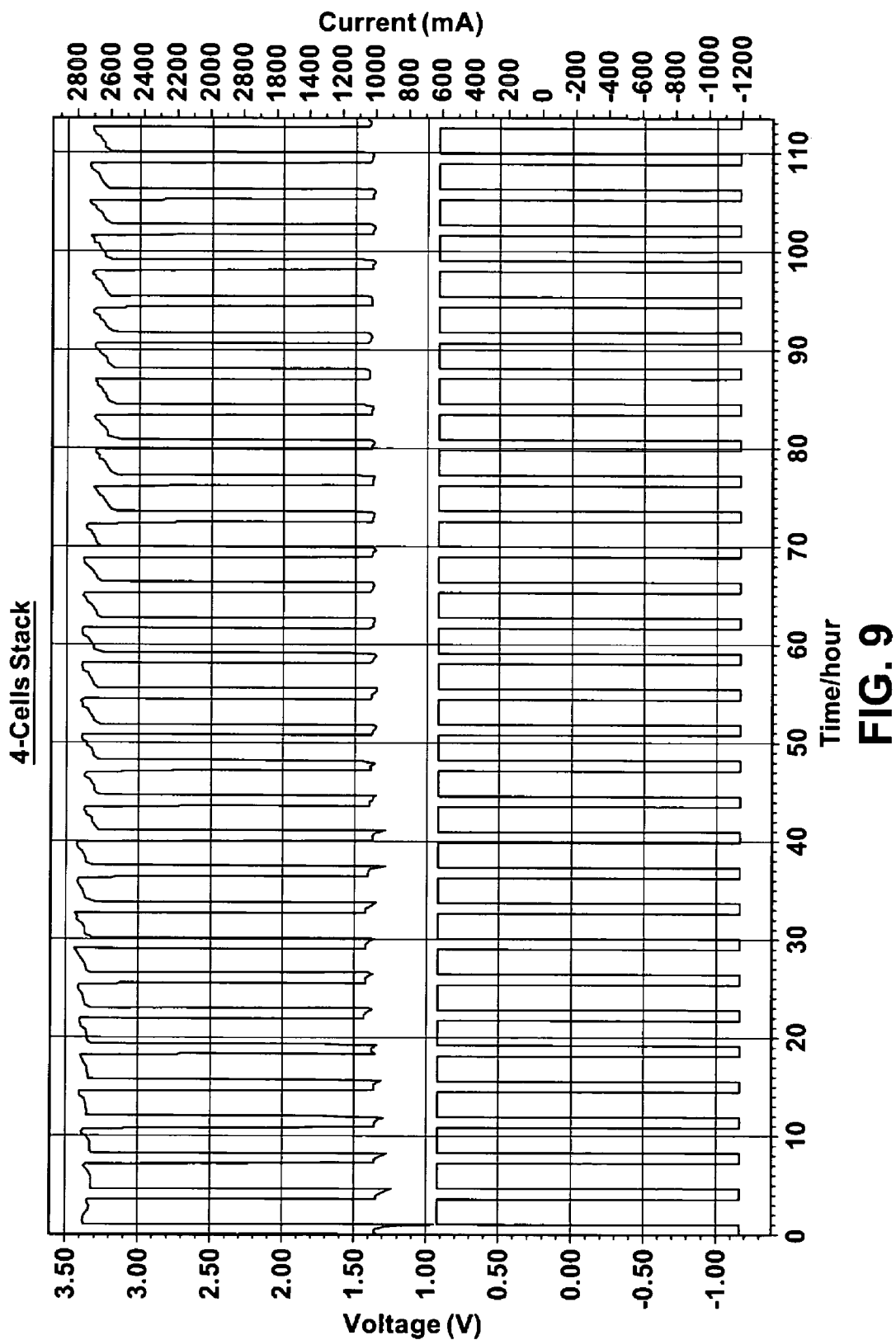
FIG. 9 is a graphic plot showing the discharge profile of four-cell stack.
Figure 10:
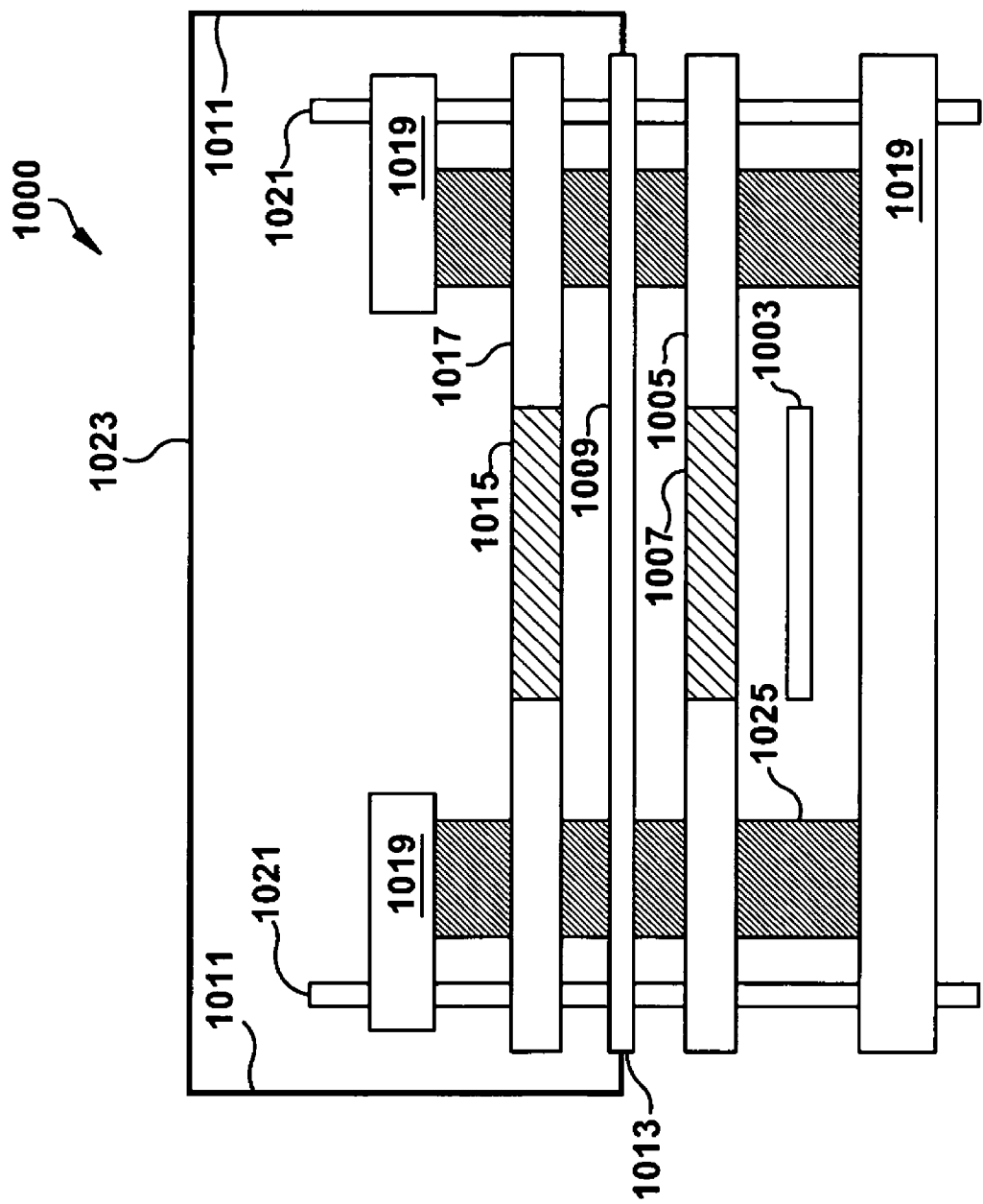
FIG. 10 is a diagram of a gas scrubber system according to an embodiment of the invention.

It is certified that error appears in the above-identified patent and that said Letters Patent is hereby corrected as shown below:

In Fig. 9, Sheet 9 of 10, delete " 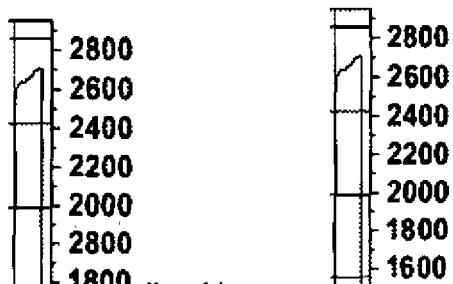 " and insert -- -- , therefor.

In Column 8, Line 29, delete "$MA_xCB_yC_z$," and insert -- $MA_xB_yC_z$, --, therefor.

In Column 15, Line 4, delete "perfluorinated." and insert -- perfluorinated, --, therefor.

Signed and Sealed this
Twentieth Day of December, 2011

David J. Kappos
*Director of the United States Patent and Trademark Office*